(12) United States Patent
Otsuka et al.

(10) Patent No.: US 8,708,392 B2
(45) Date of Patent: Apr. 29, 2014

(54) RETRACTABLE VEHICLE SEAT

(75) Inventors: Taiyou Otsuka, Kariya (JP); Toshio Araki, Kariya (JP); Eiji Mizutani, Kariya (JP); Ryo Hattori, Kariya (JP); Masashi Fujimoto, Kariya (JP); Shinji Yamada, Kariya (JP); Yasunori Takenaka, Kariya (JP)

(73) Assignees: Toyota Boshoku Kabushiki Kaisha, Aichi-Ken (JP); Toyota Shatai Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 13/582,155

(22) PCT Filed: Feb. 23, 2011

(86) PCT No.: PCT/JP2011/053941
§ 371 (c)(1),
(2), (4) Date: Nov. 9, 2012

(87) PCT Pub. No.: WO2011/108413
PCT Pub. Date: Sep. 9, 2011

(65) Prior Publication Data
US 2013/0057040 A1 Mar. 7, 2013

(30) Foreign Application Priority Data
Mar. 4, 2010 (JP) .................. 2010-047757

(51) Int. Cl.
*B60N 2/30* (2006.01)
(52) U.S. Cl.
USPC .................. 296/65.05; 296/65.11
(58) Field of Classification Search
USPC ......... 296/65.11, 65.05, 65.06; 297/214, 315, 297/326, 14
See application file for complete search history.

(56) References Cited

U.S. PATENT DOCUMENTS

| 5,984,397 | A | * | 11/1999 | Dawson et al. | ............ 296/65.09 |
| 6,460,922 | B1 | * | 10/2002 | Demick | ............ 297/14 |
| 6,460,929 | B2 | * | 10/2002 | Kamida | ............ 297/344.1 |
| 6,669,261 | B2 | * | 12/2003 | Roberts et al. | ............ 296/65.09 |
| 7,494,173 | B2 | | 2/2009 | Hatta et al. | |
| 7,954,873 | B2 | * | 6/2011 | Abe et al. | ............ 296/65.05 |
| 2003/0184129 | A1 | * | 10/2003 | Honda et al. | ............ 297/14 |
| 2013/0241257 | A1 | * | 9/2013 | Miyazawa et al. | ............ 297/314 |

FOREIGN PATENT DOCUMENTS

| JP | 3-16526 | 2/1991 |
| JP | 9-2119 | 1/1997 |
| JP | 11-208334 | 8/1999 |
| JP | 2007-112225 | 5/2007 |
| JP | 2008-137412 | 6/2008 |

OTHER PUBLICATIONS

German Office Action, mail date Dec. 20, 2013.

* cited by examiner

*Primary Examiner* — Jason S Morrow
(74) *Attorney, Agent, or Firm* — Greenblum & Bernstein, P.L.C.

(57) ABSTRACT

A retractable vehicle seat in which a seat main body disposed on a vehicle floor is flipped up laterally, so as to be retracted in a vehicle interior side wall of which the upper portion is inwardly inclined, may include a connection mechanism that is configured to rotatably connect the seat main body to a support stand. The connection mechanism includes a four-link mechanism having a stationary link integral with the support stand, an intermediate link integral with the seat main body, and a first link and a second link that connect these two links. The second link is configured to increase an angle between the first link and the intermediate link as the seat main body is flipped up.

3 Claims, 6 Drawing Sheets

RETRACTABLE VEHICLE SEAT

TECHNICAL FIELD

The present invention relates to a retractable vehicle seat. More particularly, the present invention relates to a retractable vehicle seat that is capable of being retracted to a vehicle interior side wall by laterally flipping-up a seat main body positioned on a vehicle floor.

BACKGROUND ART

A conventionally known retractable vehicle seat has a housing mechanism that is capable of retracting the seat by flipping up the whole seat toward a vehicle interior side wall after a seat back is folded back forwards. For example, a retractable vehicle seat is taught by Japanese Laid-Open Patent Publication No. 9-2119 described below. In the seat, an outer side portion of a seat cushion constituting a rear seat is rotatably hinge-connected to a vehicle wall portion via a link, so that the rear seat can be retracted in a vehicle interior side wall by flipping up the whole rear seat from a vehicle floor about a hinge point.

SUMMARY OF THE INVENTION

Problems to be Solved by the Invention

However, in the above described conventional technique, the seat and the link are integrated with each other, so that a posture of the seat with respect to the link cannot be changed. As a result, in some cases, the seat cannot be easily flipped up in conformity with the orientation of a surface of a vehicle interior side wall so as to be neatly retracted in the vehicle interior side wall.

Thus, there is a need in the art to provide an improved retractable vehicle seat.

SUMMARY OF THE INVENTION

A first aspect of the present invention provides a retractable vehicle seat in which a seat main body disposed on a vehicle floor is flipped up laterally, so as to be retracted in a vehicle interior side wall, which may include a connection mechanism that is configured to rotatably connect the seat main body to a vehicle main body. The connection mechanism includes a four-link mechanism having is composed of a stationary link integral with the vehicle main body, an intermediate link integral with the seat main body, and a first link and a second link that connect these two links. The second link is configured to increase an angle between the first link and the intermediate link as the seat main body is flipped up.

According to the first aspect of this invention, due to the action of the second link, as the seat main body is moved so as to be flipped up, the angle between the first link and the intermediate link is increased, so that the seat main body can be tilted in a direction in which a tilting posture of the seat main body with respect to the first link can be widened. Therefore, the tilting posture of the seat main body in a retracted condition can be adjusted by adjusting this tilting amount. Thus, even when the vehicle interior side wall is inwardly inclined, the seat main body can be adjusted so as to be inclined in conformity with a direction of the vehicle interior side wall. Therefore, the seat main body can be more neatly retracted along the vehicle interior side wall.

In the second aspect of the present invention, a hinge point between the second link and the stationary link may be positioned on a perpendicular bisector of a line segment connecting two positions of a hinge point between the second link and the intermediate link before and after a retracting movement, and may be positioned such that a circle drawn by rotating the hinge point between the second link and the intermediate link in a seating position of the seat main body around a hinge point between the first link and the stationary link and a circle drawn by rotating the hinge point between the second link and the intermediate link in the seating position of the seat main body around a hinge point between the second link and the stationary link can contact with each other, slightly intersect with each other or closely adjacent to each other in the seating position of the seat main body.

According to the second aspect of this invention, the hinge position between the second link and the stationary link is set such that the above-described two circles can contact with each other, slightly intersect with each other or closely adjacent to each other in the seating position of the seat main body. Therefore, a change amount of the angle between the first link and the intermediate link can be minimized within an initial range of flipping-up motion of the seat main body. Therefore, in this range, the seat main body can be flipped up and lowered in a manner that the seat main body is rotated around a single axis while the seat main body is maintained in a substantially horizontal posture in which a tilting angle change with respect to the vehicle floor is limited. Thus, for example, in a case in which lock structures are provided between the seat main body and the vehicle floor, a locking operation can be performed while the seat main body is maintained in the substantially horizontal posture. This may lead to an increased lock property.

In the third aspect of the present invention, the hinge point between the second link and the stationary link may be set such that a distance between the hinge point between the second link and the intermediate link and the hinge point between the first link and the stationary link can be gradually increased as the hinge point between the second link and the intermediate link is rotated around the hinge point between the second link and the stationary link in a flipping-up direction.

According to the third aspect of this invention, the hinge point between the second link and the stationary link is set such that the above-described distance can be gradually increased. Therefore, as the seat main body is flipped up, the intermediate link can be tilted in a direction in which the angle between the first link and the intermediate link can be gradually increased. Thus, it is possible to realize a construction in which the tilting posture of the seat main body with respect to the first link can be widened as the seat main body is flipped up.

Further, the hinge point between the second link and the stationary link can be positioned on an extension of a line passing through a central portion of a desired angle range in which the hinge point between the second link and the intermediate link in the seating position of the seat main body can be flipped up around the hinge point between the first link and the stationary link while the seat main body is maintained in a substantially horizontal posture from the seating position and then passing through the hinge point between the first link and the stationary link.

In this construction, because the hinge point between the second link and the stationary link is set on the above-described position, the two circles defined in the second aspect can be placed in a condition in which they contact with each other, slightly intersect with each other or closely adjacent to each other in an initial range of the flipping-up motion of the seat main body. Therefore, the seat main body can be flipped up from the vehicle floor and lowered on the vehicle floor while it is maintained in the substantially horizontal posture in which a tilting angle change with respect to the vehicle floor is small.

DETAILED DESCRIPTION OF THE INVENTION

In the following, a mode for carrying out the present invention will be described with reference to the drawings.

Embodiment 1

Figure 1:
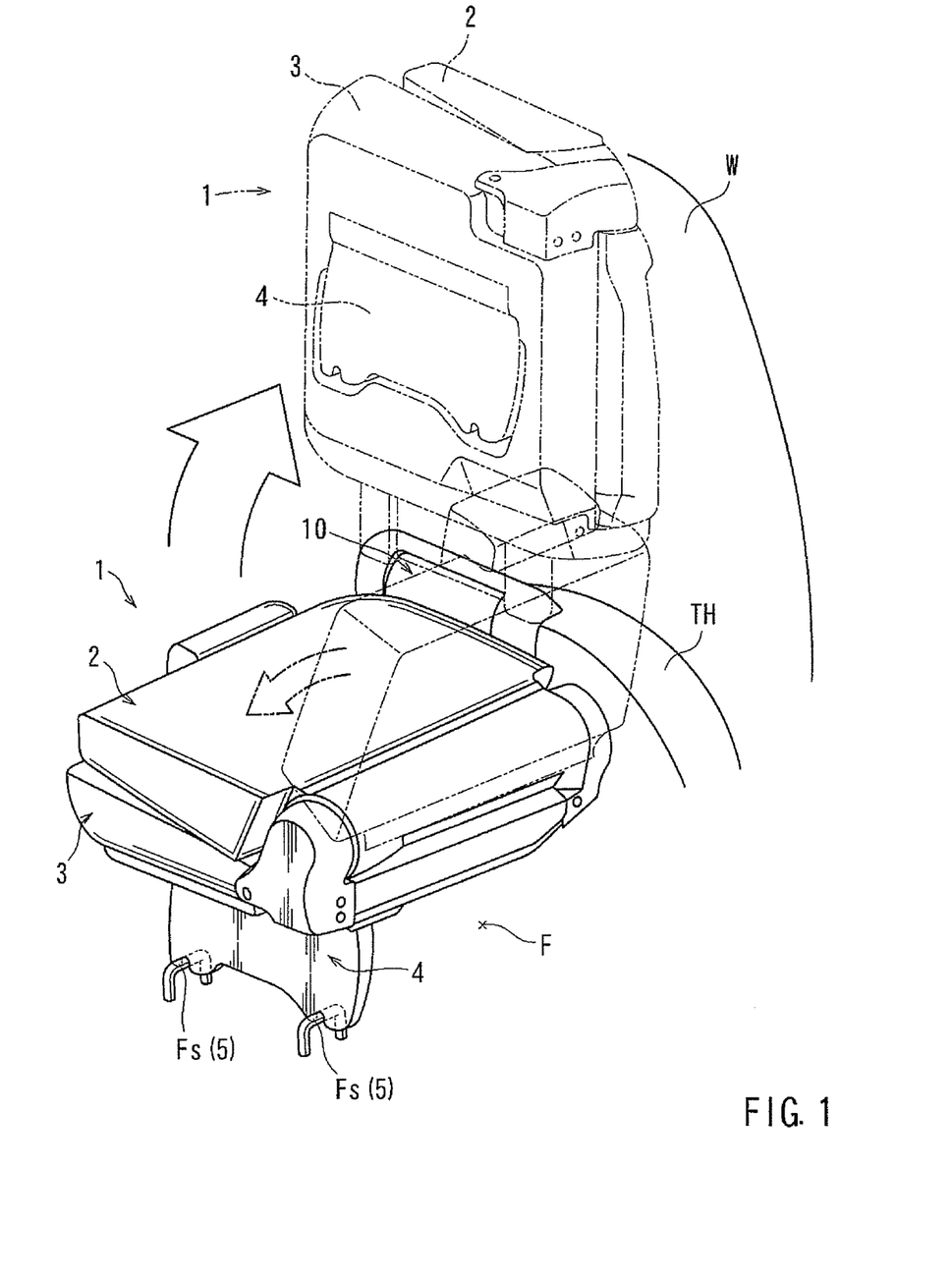
FIG. 1 is a perspective view schematically illustrating the construction of a retractable vehicle seat according to embodiment 1.

First, a construction of a retractable vehicle seat according to Embodiment 1 will be described with reference to FIGS. 1 to 6. As shown in FIG. 1, a retractable vehicle seat according to the present embodiment constitutes a seat of a rearmost row behind a driver's seat of a vehicle. A seat main body 1 constituting a seat main portion of the seat has a seat back 2 and a seat cushion 3. In this retractable vehicle seat, an outer side portion (a side portion adjacent to a vehicle interior side wall W) of the seat cushion 3 is rotatably connected to an upper portion of a tire house TH of the vehicle interior side wall W (a vehicle main body) via a connection mechanism 10 having a four-link mechanism, so as to rotationally raise and lower the seat.

Further, in the retractable vehicle seat, an inner side portion of the seat cushion 3 is supported on a vehicle floor F (the vehicle main body) via a leg plate 4 that is vertically positioned on a lower portion of the seat cushion 3. When the seat main body 1 is lowered on the vehicle floor F, i.e., placed in a seating position, the leg plate 4 is vertically maintained in the lower portion of the seat cushion 3, so that two front and rear lock devices 5 positioned on a lower portion thereof can respectively be engaged with two front and rear strikers Fs disposed on the vehicle floor F. These lock devices 5 are pushed into the strikers Fs straight from above. As a result, inner lock structures of the lock devices 5 are pushed and moved by the strikers Fs, so that the lock devices 5 can be locked in a condition in which it is engaged with the strikers Fs.

As a result, the seat cushion 3 can normally be maintained in a horizontal posture capable of being used as a seating portion while right and left side portions thereof are engaged with the vehicle main body. Conversely, lower end portions of right and left sides of the seat back 2 are rotatably connected to rear end portions of the right and left sides of the seat cushion 3 via reclining devices (not shown) functioning as rotatable shaft devices that are capable of being rotationally stopped.

Thus, due to the reclining devices, the seat back 2 can be maintained in a condition in which a backrest angle thereof can be secured, or can be changed to a condition in which a secured condition of the backrest angle is released such that the seat back 2 can be folded up on an upper surface portion of the seat cushion 3. In the above-described retractable vehicle seat, the seat back 2 can be folded up forwards from a seating posture in which the seat back 2 is tilted up with respect to the seat cushion 3. Further, the entire seat main body 1 can be flipped up toward the vehicle interior side wall W with a link motion of the above-described connection mechanism 10, so as to be retracted neatly along the vehicle interior side wall W of which the upper portion is inclined inwardly.

Figure 2:
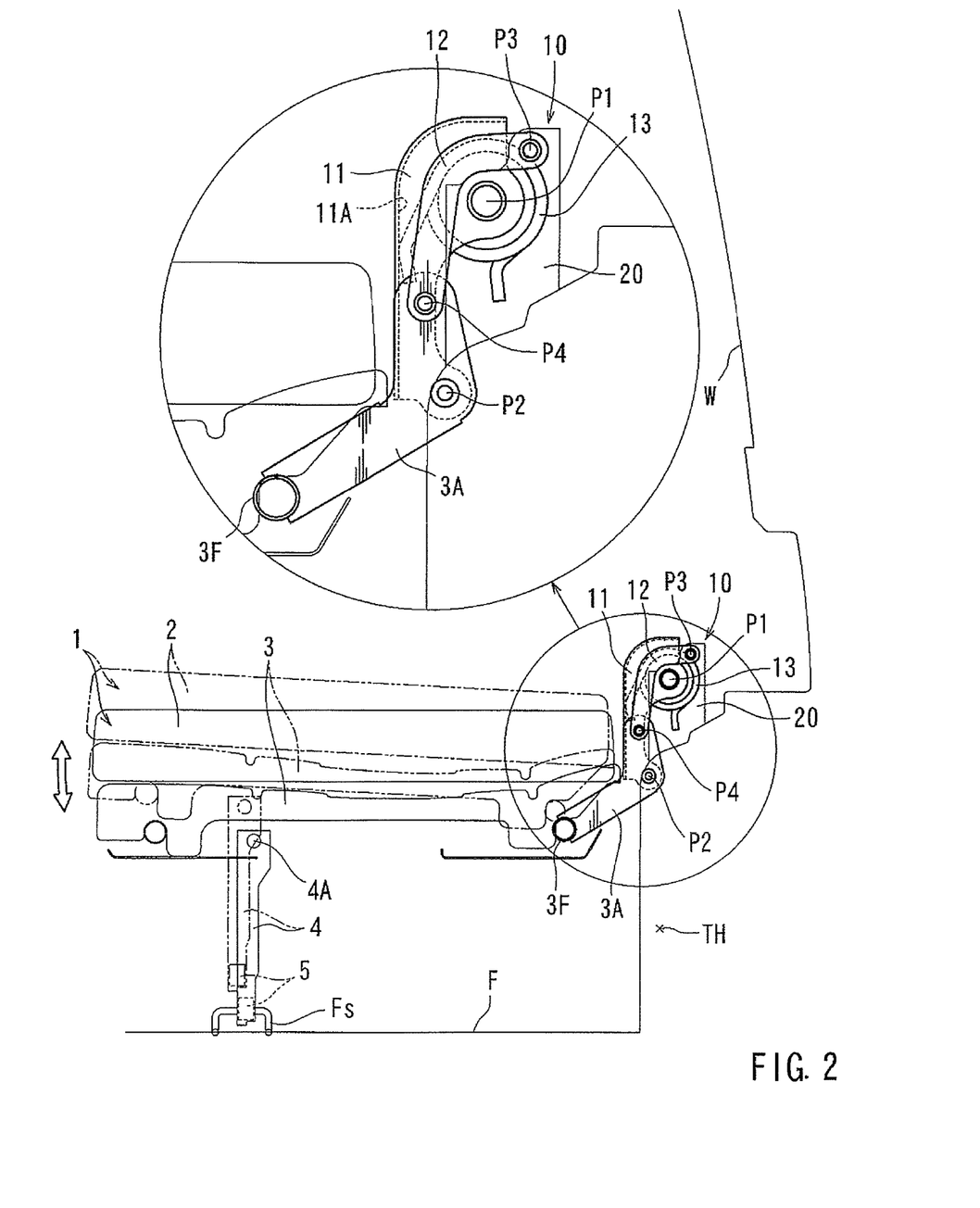
FIG. 2 is a schematic diagram illustrating a seat main body in a seating position on a vehicle floor as seen from the vehicle rear side.

In the following, a construction of the connection mechanism 10 that is configured to flip up the seat main body 1 to retract the same in conformity with the vehicle interior side wall W will be described in detail with reference to FIGS. 2 to 6. As shown in FIG. 2, in this connection mechanism 10, an outer side portion of a cushion frame 3F constituting a framework of the seat cushion 3 is connected to a support stand 20 positioned on the upper portion of the tire house TH, so as to form the four-link mechanism. Further, the support stand 20 corresponds to a stationary link as referred to in the present invention.

In particular, an intermediate link 3A is integrally connected to the outer side portion of the cushion frame 3F. The intermediate link 3A extends toward the vehicle interior side wall W and is bent upwards in an L-shape. Further, an upwardly bent portion of this L-shaped intermediate link 3A is link-connected to the support stand 20 as the stationary link by two links (a first link 11 and a second link 12). The first link 11 and the second link 12 are respectively rotatably pin-connected to the intermediate link 3A and the support stand 20 via first to fourth connection pins P1 to P4.

Figure 3:
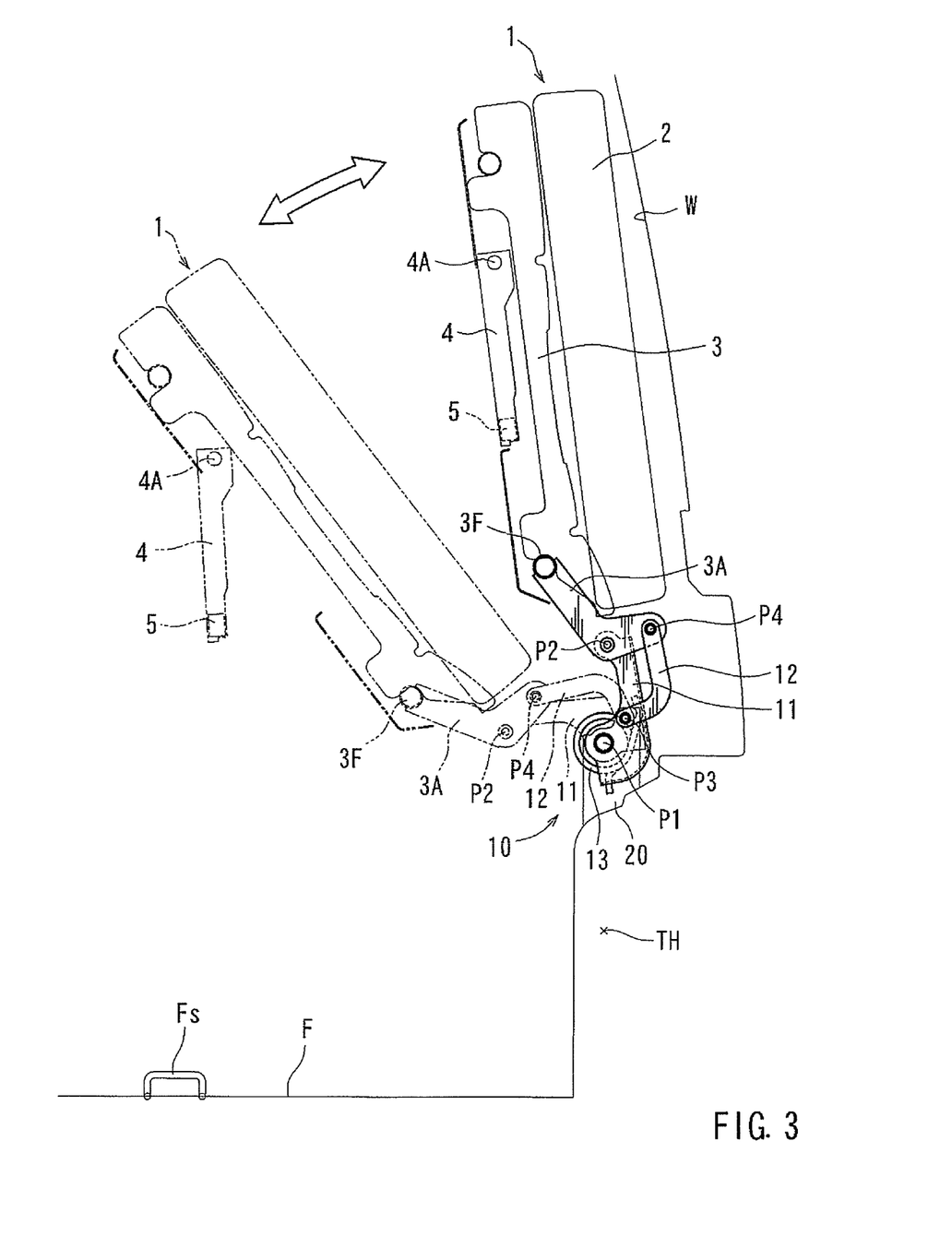
FIG. 3 is a schematic diagram illustrating the seat main body as flipped up and retracted in a vehicle interior side wall as seen from the vehicle rear side.
Figure 4:
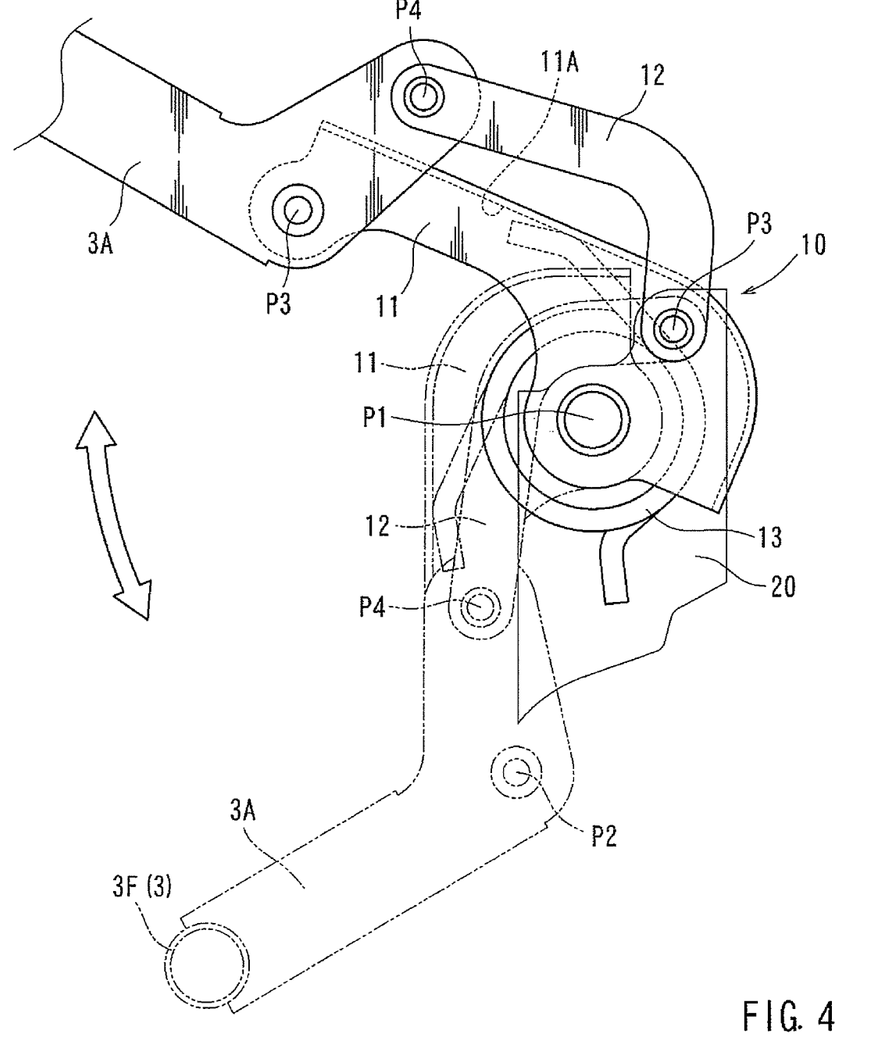
FIG. 4 is an enlarged view of a connection mechanism.

In particular, the first link 11 is rotatably pin-connected to the support stand 20 and the intermediate link 3A via the first connection pin P1 and the second connection pin P2. Conversely, the second link 12 is rotatably pin-connected to the support stand 20 and the intermediate link 3A by the third connection pin P3 and the fourth connection pin P4. Thus, as shown in FIGS. 2 to 4, the four-link mechanism can be formed between the seat main body 1 and the vehicle main body. The four-link mechanism is capable of flipping up the seat main body 1 from the seating position (a position shown in FIG. 2) on the vehicle floor F to a position (a position shown in FIG. 3) in which it extends along the vehicle interior side wall W when the first link 11 and the second link 12 are upwardly rotated around hinge points (the first connection pin P1 and the third connection pin P3) between the links 11 and 12 and the support stand 20.

A torsion spring 13 is attached to the connection mechanism 10 that is constructed of the above-described four-link mechanism. The torsion spring 13 constantly biases this connection mechanism 10 in a rotating direction in which the seat main body 1 can be flipped up toward the vehicle interior side wall W. This torsion spring 13 is wound around the first connection pin P1. One end of the torsion spring 13 is secured to the support stand 20. Conversely, the other end of the torsion spring 13 is pressed against a cover surface 11A facing a rotating direction of the first link 11 by a biasing force due to a torsional restoring force thereof.

As a result, the torsion spring 13 normally rotationally biases the first link 11 about the first connection pin P1 in a direction in which the first link 11 can be raised toward a vehicle inner side (clockwise in the drawings). Therefore, as shown in FIGS. 2 and 3, when a locked condition of the lock devices 5 of the leg plate 4 vertically positioned on a lower portion of the seat cushion 3 and the strikers Fs is released, due to this biasing force, the connection mechanism 10 can perform the link motion such that the seat main body 1 can be flipped up from the seating position on the vehicle floor F toward the vehicle interior side wall W.

Figure 5:
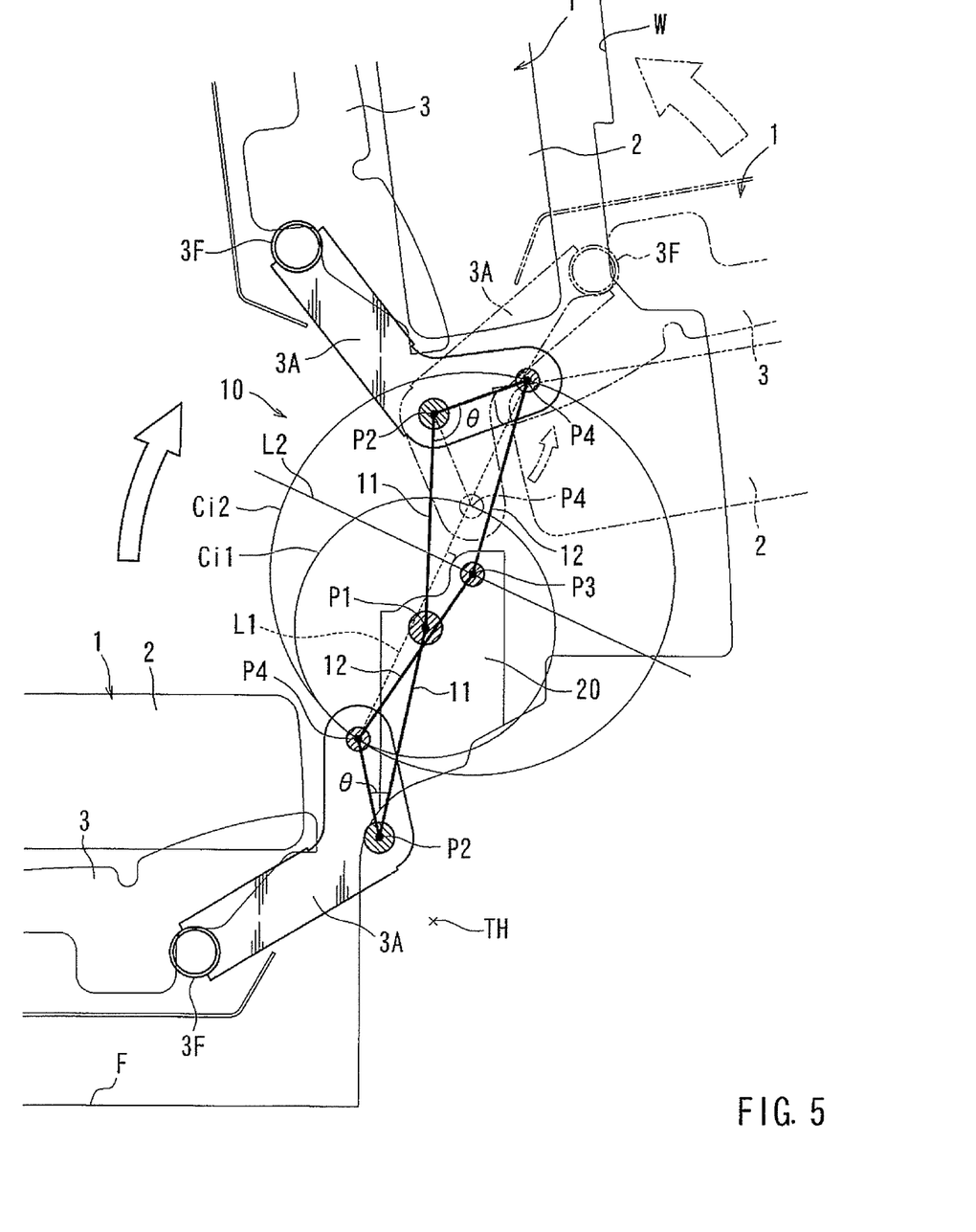
FIG. 5 is a schematic diagram illustrating a process for determining the position of each joint point of the connection mechanism.

As shown in FIG. 5, the first to fourth connection pins P1 to P4 functioning as joint points between the first link 11 and the second link 12 of the connection mechanism 10 are respectively determined on the following positions. That is, first, the first connection pin P1 functioning as the hinge point between the first link 11 and the support stand 20 (the stationary link) and the second connection pin P2 functioning as a hinge point between the first link 11 and the intermediate link 3A (the seat main body 1) are respectively positioned on arbitrary positions such that the first link 11 connecting the seat main body 1 in the seating position on the vehicle floor F and the support stand 20 can be obliquely drooped downwards and inwards in a vehicle interior (downwards and leftwards in the drawings).

Next, a position of the third connection pin P3 functioning as the hinge point between the second link 12 and the support stand 20 (the stationary link) is set. In order to set the position of the third connection pin P3, a position of the fourth connection pin P4 functioning as a hinge point between the second link 12 and the intermediate link 3A (the seat main body 1) is first positioned on an arbitrary position that is spaced away from the second connection pin P2. It is to be noted that a posture of the intermediate link 3A (the seat main body 1) with respect to the first link 11 can be determined by a positional relation between the fourth connection pin P4 and the previously-described second connection pin P2.

Next, it is possible to consider rotational motion of the fourth connection pin P4 determined on the above-described arbitrary position around the first connection pin P1 (a trajectory circle Ci1) in a condition in which the first link 11 and the intermediate link 3A are integrated with each other. If such a rotational motion is performed, the intermediate link 3A (the seat main body 1) can be flipped up toward the vehicle interior side wall W while an angle θ between the intermediate link 3A and the first link 11 is maintained constant. However, at this time, the first link 11 can be changed to a raised posture, so that the seat main body 1 can be flipped up to a high position. As a result, the intermediate link 3A can be shifted to a posture in which the intermediate link 3A cause the seat main body 1 to be projected to a vehicle exterior beyond the vehicle interior side wall W.

Next, in a condition in which the seat main body 1 is flipped up to the high position, the intermediate link 3A is rotated counterclockwise in the drawings about the second connection pin P2, so as to adjust a posture of the seat main body 1 such that the seat main body 1 can extend along a shape of the vehicle interior side wall W. As a result, the fourth connection pin P4 can be determined on a position deviated from the above-described trajectory circle Ci1. This condition can be determined as a posture of the seat main body 1 in which it is flipped up toward the vehicle interior side wall W and is retracted therealong.

Next, a line segment L1 connecting two positions of the fourth connection pin P4 before and after a retracting movement (both of which are shown by solid lines) is drawn. Further, a perpendicular bisector L2 of this line segment L1 is drawn. The third connection pin P3 functioning as the hinge point between the second link 12 and the support stand 20 (the stationary link) can be positioned on this perpendicular bisector L2. In particular, the third connection pin P3 can be positioned on the perpendicular bisector L2. At the same time, the third connection pin P3 can be positioned such that a trajectory circle Ci2 drawn by rotating the second connection pin P2 around the third connection pin P3 and the previously-described trajectory circle Ci1 drawn by rotating the fourth connection pin P4 in the position before the retracting movement around the first connection pin P1 can slightly overlap and intersect with each other within an angle range of the seat main body 1 in which the seat main body 1 is flipped up from the seating position on the vehicle floor F to a predetermined position.

Figure 6:
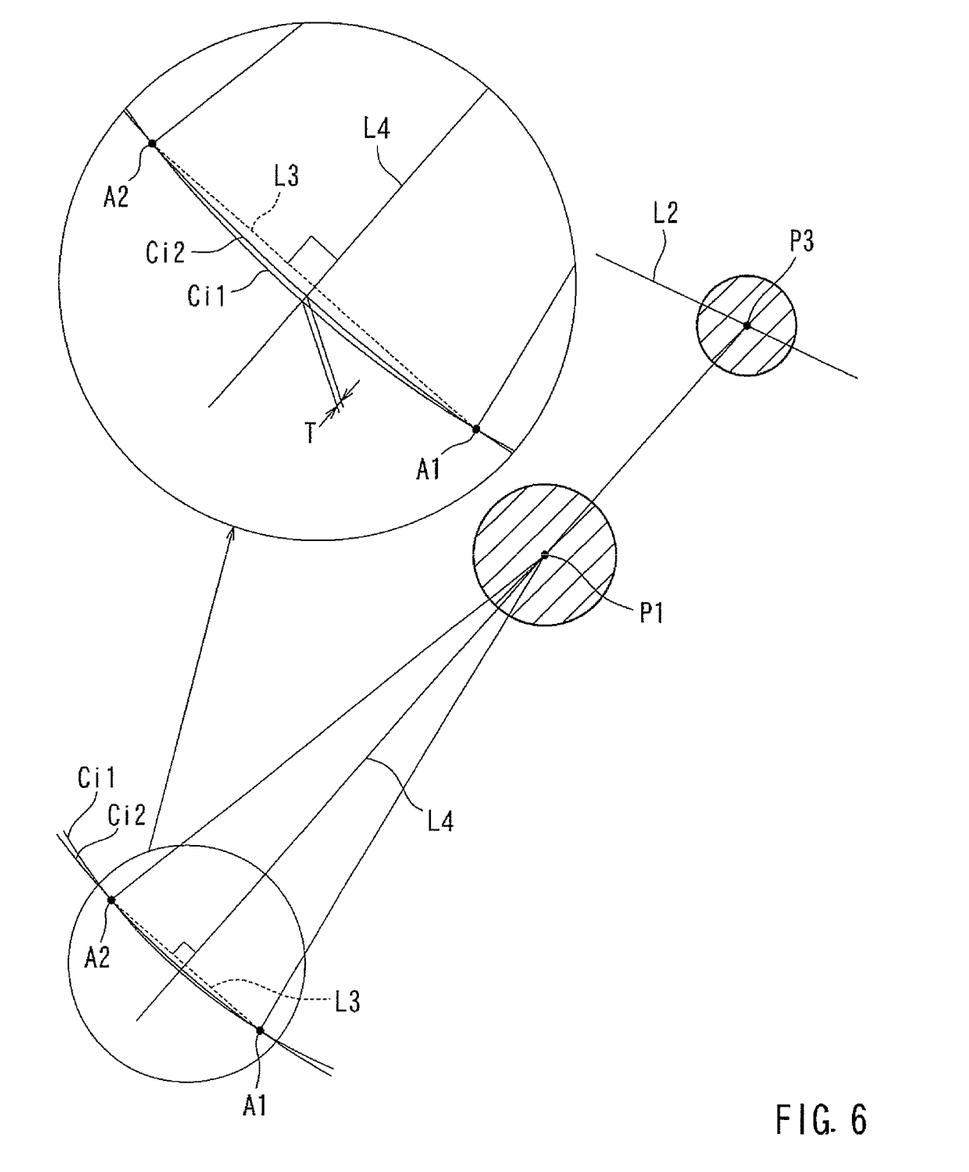
FIG. 6 is a schematic diagram illustrating a process for determining the position of each joint point of the connection mechanism.

In particular, as shown in FIG. 6, the trajectory circle Ci1 and the trajectory circle Ci2 can intersect with each other (an intersection point A1) in the position of the fourth connection pin P4 before the retracting movement (in which the seat main body 1 is in the seating position), and can intersect with each other again (an intersection point A2) in a position of the fourth connection pin P4 in which the fourth connection pin P4 is rotated by 20 degrees around the first connection pin P1 in a flipping-up direction of the seat main body 1. An extension of a perpendicular bisector L4 of a line segment L3 connecting the intersection points A1 and A2 can pass through the first connection pin P1 and intersect the above-described perpendicular bisector L2 (FIG. 5). The third connection pin P3 can be positioned on an intersection point of the extension of perpendicular bisector L4 and the perpendicular bisector L2.

The above-described trajectory circles Ci1 and Ci2 are formed so as to draw proximate curves in close proximity to each other within a range between the intersections A1 and A2 at which the trajectory circles Ci1 and Ci2 intersect with each other. Further, the trajectory circles Ci1 and Ci2 are determined such that a distance T (a maximum separation distance) between the trajectory circles Ci1 and Ci2 through which the above-described perpendicular bisector L4 passes through is not more than 2 mm. Therefore, in the connection mechanism 10 in which the position of the third connection pin P3 is determined as described above, an angle change amount of the angle θ between the first link 11 and the intermediate link 3A can be small within an angle range between the intersections A1 and A2 at which the trajectory circles Ci1 and Ci2 intersect with each other, i.e., within an initial range of flipping-up motion of the seat main body 1, so that the seat main body 1 can be flipped up from the vehicle floor F and lowered on the vehicle floor F while the seat main body 1 is maintained in a substantially horizontal posture (FIG. 2).

Thus, the lock devices 5 can be engaged with the strikers Fs while they can be pushed into the strikers Fs straight from above without involving any abrupt change in angle, so as to provide a reliable lock property (FIG. 2). Further, as shown in FIG. 5, because the third connection pin P3 is set described above, a distance between the fourth connection pin P4 and the first connection pin P1 functioning as the hinge point between the first link 11 and the support stand 20 (the stationary link) can be gradually increased as the fourth connection pin P4 is rotated around the first connection pin P1 in the flipping-up direction from the position before the retracting movement.

This means that the angle change amount of the angle θ between the first link 11 and the intermediate link 3A can increase as the seat main body 1 is flipped up. That is, an angle change amount of an angle between the seat main body 1 and the first link 11 can be gradually increased as the seat main body 1 is flipped up. Therefore, even if setting is made such that the angle change amount of the angle between the seat main body 1 and the first link 11 can be minimized in the initial range of the flipping-up motion of the seat main body 1, when the seat main body 1 is flipped up toward the vehicle interior side wall W, the posture of the seat main body 1 can be greatly changed in angle, so that the seat main body 1 can be reliably changed to extend along the shape of the vehicle interior side wall W of which the upper portion is inclined toward the vehicle interior. This may lead to an increased operability for retracting (FIG. 3).

With reference to FIG. 2 again, an upper end portion of the leg plate 4 that is vertically positioned on the lower portion of the above-described seat cushion 3 is rotatably pin-connected to the lower portion of the seat cushion 3 via a connection shaft 4A, so as to rotationally raise and lower the leg plate 4. The leg plate 4 can normally be biased by a spring member (not shown) so as to be projected toward a posture in which it is vertically positioned on the lower portion of the seat cushion 3. Further, the above-described leg plate 4 is connected to the vehicle interior side wall W by a wire (not shown). The wire is configured to be pulled as the seat main body 1 is flipped up from the vehicle floor F, so that the leg plate 4 can be folded up into a recess formed in a lower surface of the seat cushion 3 against a spring force of the spring member described above (FIG. 1).

As a result, when the seat main body 1 is retracted in the vehicle interior side wall W, the leg plate 4 can be retracted in the lower surface portion of the seat cushion 3 so as to not protrude into the vehicle interior. Further, the seat main body 1 retracted in the vehicle interior side wall W can be fastened by a belt (not shown) that is engaged with the vehicle interior side wall W, so as to be maintained in a condition in which it is secured to the vehicle interior side wall W. In order to rotationally lower the retracted seat main body 1 onto the vehicle floor F and to return the same to a condition in which it can be used for seating, it is only necessary to press down the seat main body 1 onto the seat floor F after the above-described belt is disengaged.

As a result, as shown in FIG. 3, the link motion of the connection mechanism 10 can be performed in a direction reverse to a direction at the time of flipping up described above, so that the seat main body 1 can be restored to the horizontal posture parallel to the vehicle floor F. At the same time, the wire (not shown) can be loosened, so that the leg plate 4 can be projected by the spring force toward a condition in which it is vertically positioned on the lower portion of the seat cushion 3. Further, the seat main body 1 is operated so as to be pressed down onto the vehicle floor F while maintaining this condition. As a result, the lock devices 5 positioned on the lower portion of the leg plate 4 can be pressed into the strikers Fs positioned on the vehicle floor F, so that a lock operation can be performed. Thus, the seat main body 1 can be restored to the condition in which it is rotationally lowered onto the vehicle floor F and is engaged therewith as previously described with reference to FIG. 2.

In particular, the leg plate 4 is configured to be maintained in a condition in which it is completely projected to a position in which it is vertically positioned on the lower portion of the seat cushion 3 in a straight fashion when the seat main body 1 reaches a rotation range in the vicinity of its fully lowered point described above. As a result, the lock devices 5 can be engaged with the strikers Fs while they can be pushed into the strikers Fs straight from above without involving any abrupt change in angle, so as to provide the reliable lock property.

After the lock devices 5 are engaged with and locked to the strikers Fs, the seat back 2 is rotationally raised backwards. Thus, the seat main body 1 can be returned to the former condition in which it can be used for seating. In this way, according to the retractable vehicle seat of the present embodiment, due to the action of the second link 12, the angle θ between the first link 11 and the intermediate link 3A can increase as the seat main body 1 is flipped up. As a result, the seat main body 1 can be tilted in a direction in which a tilting posture of the seat main body 1 with respect to the first link 11 can be widened. Therefore, the tilting posture of the seat main body 1 in a retracted condition can be adjusted by adjusting this tilting amount. Thus, even when the vehicle interior side wall W is inwardly inclined as this embodiment, the seat main body 1 can be adjusted so as to be inclined in conformity with a direction of the vehicle interior side wall W. Therefore, the seat main body 1 can be more neatly retracted along the vehicle interior side wall W.

Further, the hinge point (the third connection pin P3) between the second link 12 and the support stand 20 (the stationary link) can be set such that the above-described two circles (the trajectory circles Ci1 and Ci2) can slightly overlap and intersect with each other when the seat main body 1 is in the seating position. Therefore, the change amount of the angle θ between the first link 11 and the intermediate link 3A can be limited within the initial range of flipping-up motion of the seat main body 1. Therefore, in this range, the seat main body 1 can be flipped up and lowered in a manner that the seat main body 1 is rotated around a single axis while the seat main body 1 is maintained in the substantially horizontal posture in which a tilting angle change with respect to the vehicle floor F is limited. Thus, as the present embodiment, in a case in which the lock structures are provided between the seat main body 1 and the vehicle floor F, the locking operation can be performed while the seat main body 1 is maintained in the substantially horizontal posture. This may lead to an increased lock property.

An embodiment of the present invention is described above. However, the present invention can be carried out in various forms other than the above-described embodiment. For example, in the above-described embodiment, the third connection pin P3 functioning as the hinge point between the second link 12 and the support stand 20 (the vehicle main body) is positioned on the intersection point of the two perpendicular bisectors L2 and L4. However, the third connection pin P3 can be positioned on the perpendicular bisector L2 and not on the perpendicular bisector L4. Further, if the third connection pin P3 is positioned so as to be deviated from both of the two perpendicular bisectors L2 and L4, a connection mechanism can be operated in the substantially same movement mode as the present embodiment provided that the third connection pin P3 is positioned in the vicinity of the intersection point of the two perpendicular bisectors L2 and L4.

Further, in the above-described embodiment, the leg plate 4 is vertically positioned on the lower portion of the seat cushion 3 as a means for engaging the seat main body 1 with the vehicle floor F. Further, the lock devices 5 provided on the lower portion of the leg plate 4 are configured to engage the strikers Fs positioned on the vehicle floor F. However, the lock devices 5 can be directly provided to the lower portion of the seat cushion 3, so as to be engaged with and locked to the strikers Fs positioned on the vehicle floor F. Further, the lock devices 5 can be positioned on the vehicle floor F while the strikers Fs is positioned on the seat main body 1.

Further, in the above-described embodiment, the third connection pin P3 is set such that the above-described two circles (the trajectory circles Ci1 and Ci2) can slightly overlap and intersect with each other in the seating position of the seat main body 1. However, even if the third connection pin P3 is set such that these circles can contact with each other, slightly intersect with each other or closely adjacent to each other, in the initial range of flipping-up motion of the seat main body 1, the seat main body 1 can be flipped up and lowered while it is maintained in the substantially horizontal posture in which the tilting angle change is small. Further, in the above-described embodiment, the vehicle interior side wall W of which the upper portion is inclined toward the vehicle interior is exemplified. However, a vehicle interior side wall can be vertically extended or inclined toward the vehicle exterior.

What is claimed is:

1. A retractable vehicle seat in which a seat main body disposed on a vehicle floor is configured to flip up laterally, so as to be retracted in a vehicle interior side wall, comprising:
 a connection mechanism that is configured to rotatably connect the seat main body to a vehicle main body, the connection mechanism comprising:
 a four-link mechanism having a stationary link integral with the vehicle main body;
 an intermediate link integral with the seat main body; and
 a first link and a second link that connect the stationary link and the intermediate link,
 wherein the second link is configured to increase an angle between the first link and the intermediate link as the seat main body is flipped up, and
 wherein when the seat main body is flipped up, a spacing between the first link and the second link is increased.

2. The retractable vehicle seat as defined in claim 1, wherein a hinge point between the second link and the stationary link is positioned on a perpendicular bisector of a line segment connecting two positions of a hinge point between the second link and the intermediate link before and after a retracting movement, and is positioned such that a circle drawn by rotating the hinge point between the second link and the intermediate link in a seating position of the seat main body around a hinge point between the first link and the stationary link and a circle drawn by rotating the hinge point between the second link and the intermediate link in the seating position of the seat main body around a hinge point between the second link and the stationary link can one of contact each other, slightly intersect each other or be drawn closely adjacent to each other in the seating position of the seat main body.

3. The retractable vehicle seat as defined in claim 2, wherein the hinge point between the second link and the stationary link is set such that a distance between the hinge point between the second link and the intermediate link and the hinge point between the first link and the stationary link can be gradually increased as the hinge point between the second link and the intermediate link is rotated around the hinge point between the second link and the stationary link in a flipping-up direction.

* * * * *